United States Patent
Woolaway et al.

(10) Patent No.: US 8,946,640 B2
(45) Date of Patent: Feb. 3, 2015

(54) UNIT CELLS WITH AVALANCHE PHOTODIODE DETECTORS

(71) Applicant: FLIR Systems, Inc., Wilsonville, OR (US)

(72) Inventors: James T. Woolaway, Santa Barbara, CA (US); John D. Schlesselmann, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 13/922,912

(22) Filed: Jun. 20, 2013

(65) Prior Publication Data

US 2013/0277561 A1 Oct. 24, 2013

Related U.S. Application Data

(63) Continuation of application No. PCT/US2011/064993, filed on Dec. 14, 2011.

(60) Provisional application No. 61/426,922, filed on Dec. 23, 2010.

(51) Int. Cl.

| | |
|---|---|
| *G01J 5/02* | (2006.01) |
| *G01J 1/46* | (2006.01) |
| *H04N 5/357* | (2011.01) |
| *H04N 5/363* | (2011.01) |
| *H04N 5/369* | (2011.01) |
| *H04N 5/3745* | (2011.01) |

(52) U.S. Cl.
CPC ............. *G01J 1/46* (2013.01); *H04N 5/3577* (2013.01); *H04N 5/363* (2013.01); *H04N 5/3698* (2013.01); *H04N 5/37452* (2013.01)

USPC .......................... 250/340; 250/252.1

(58) Field of Classification Search
USPC ................................. 250/340, 252.1
See application file for complete search history.

(56) References Cited

U.S. PATENT DOCUMENTS

| | | | |
|---|---|---|---|
| 4,364,116 | A | 12/1982 | Nossek |
| 4,947,057 | A | 8/1990 | Czarnocki et al. |
| 5,756,999 | A | 5/1998 | Parrish et al. |
| 6,028,309 | A | 2/2000 | Parrish et al. |
| 6,316,777 | B1 | 11/2001 | Parrish et al. |
| 6,359,460 | B1 | 3/2002 | Tanaka |
| 6,465,798 | B1 | 10/2002 | Hoelter et al. |
| 6,696,884 | B1 | 2/2004 | Seven |
| 6,730,909 | B2 | 5/2004 | Butler |

(Continued)

FOREIGN PATENT DOCUMENTS

| | | |
|---|---|---|
| GB | 2426575 | 11/2006 |
| JP | 2000114467 | 4/2000 |

(Continued)

*Primary Examiner* — David Porta
*Assistant Examiner* — Abra Fein
(74) *Attorney, Agent, or Firm* — Haynes and Boone, LLP

(57) ABSTRACT

Various techniques are disclosed for providing reference signals to image detectors in accordance with one or more embodiments of the invention. For example, in one or more embodiments, switched capacitors may be used to provide bias voltages to individual unit cells of a focal plane array such that the bias voltages are held by the unit cells over one or more integration periods while the unit cells are decoupled from an input line. As a result, the bias voltages may be free from noise incident on the input line and thus may more accurately bias the individual unit cells.

22 Claims, 11 Drawing Sheets

(56) References Cited

U.S. PATENT DOCUMENTS

| | | |
|---|---|---|
| 6,812,465 B2 | 11/2004 | Parrish et al. |
| 7,034,301 B2 | 4/2006 | Parrish et al. |
| 7,423,458 B2 | 9/2008 | Aghtar |
| 2002/0022938 A1 | 2/2002 | Butler |
| 2002/0166968 A1 | 11/2002 | Bradley |
| 2003/0090316 A1 | 5/2003 | Dathe et al. |
| 2003/0213910 A1 | 11/2003 | Anderson et al. |
| 2006/0197664 A1* | 9/2006 | Zhang et al. .................. 340/555 |
| 2009/0014653 A1 | 1/2009 | Parrish |
| 2009/0074120 A1 | 3/2009 | Toosky et al. |
| 2010/0091167 A1* | 4/2010 | Azami .......................... 348/340 |
| 2010/0102203 A1 | 4/2010 | Grund |

FOREIGN PATENT DOCUMENTS

| | | |
|---|---|---|
| SU | 938388 B * | 6/1982 |
| WO | WO 2006/020874 | 2/2006 |
| WO | WO 2007/015235 | 2/2007 |
| WO | WO 2010/048626 | 4/2010 |
| WO | WO 2010/084493 | 7/2010 |

* cited by examiner

UNIT CELLS WITH AVALANCHE PHOTODIODE DETECTORS

CROSS-REFERENCE TO RELATED APPLICATIONS

This application is a continuation of International Patent Application No. PCT/US2011/064993 filed Dec. 14, 2011, which claims the benefit of U.S. Provisional Patent Application No. 61/426,922 filed Dec. 23, 2010, all of which are hereby incorporated by reference in their entirety.

TECHNICAL FIELD

One or more embodiments of the invention relate generally to image detectors and more particularly, for example, to providing reference signals to image detectors.

BACKGROUND

There are a wide variety of image detectors, such as visible image detectors, infrared image detectors, or other types of image detectors that may be provided in an image detector array to capture an image to store or to display. As an example, a plurality of photodiodes may be provided in an image detector array, such as a focal plane array, to capture images.

A typical image detector array requires a stable reference signal, such as a voltage reference signal, with minimal noise to produce a high-quality image. However, a conventional voltage reference signal generator may provide a reference signal such as a bias voltage that includes a high-frequency noise component and/or noise that varies from row to row within the detector array. These types of noise components are difficult to remove from output signals of the image detector array and thus may limit the overall performance of the image detector array. As a result, there is a need for improved techniques to provide reference signals for an image detector array.

SUMMARY

Various techniques are disclosed for providing reference signals to image detectors in accordance with one or more embodiments of the invention. For example, in one or more embodiments, switched capacitors may be used to provide bias voltages to individual unit cells of a focal plane array such that the bias voltages are held by the unit cells over one or more integration periods while the unit cells are decoupled from an input line. As a result, the bias voltages may be free from noise incident on the input line and thus may more accurately bias the individual unit cells.

In accordance with one embodiment of the invention, a unit cell of a focal plane array includes a detector comprising an avalanche photodiode adapted to provide a detector signal in response to infrared light received by the detector; a first capacitor adapted to store a bias voltage while additional bias voltages are loaded into other unit cells of the focal plane array; a first switch adapted to connect the first capacitor to an input line to provide the bias voltage from the input line to the first capacitor and disconnect the first capacitor from the input line after the bias voltage is provided; a second capacitor adapted to store the bias voltage during at least one integration period of the focal plane array; a second switch adapted to provide the bias voltage from the first capacitor to the second capacitor prior to the at least one integration period; and an output node adapted to store an output voltage that changes in response to the detector signal and the bias voltage stored by the second capacitor.

In accordance with another embodiment of the invention, a method of operating a unit cell of a focal plane array includes connecting a first capacitor of a unit cell of the focal plane array to an input line; providing a bias voltage from the input line to the first capacitor; disconnecting the first capacitor from the input line after the bias voltage is provided; storing the bias voltage at the first capacitor while additional bias voltages are loaded into other unit cells of the focal plane array; providing the bias voltage from the first capacitor to a second capacitor; storing the bias voltage at the second capacitor during at least one integration period of the focal plane array; biasing a detector with the bias voltage stored at the second capacitor during the at least one integration period, wherein the detector comprises an avalanche photodiode adapted to provide a detector signal in response to infrared light received by the detector; and storing at an output node an output voltage that changes in response to the detector signal and the bias voltage stored by the second capacitor.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
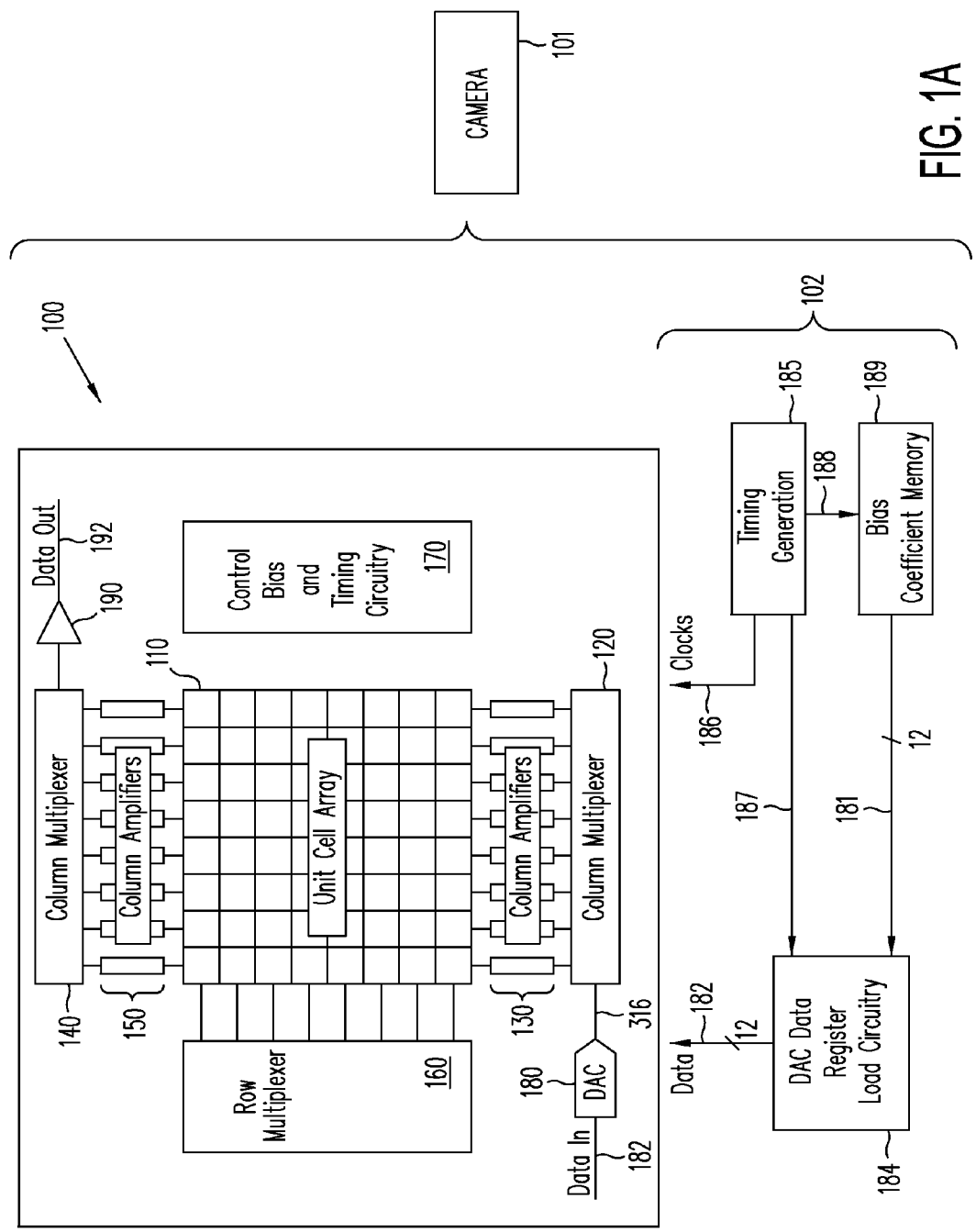
FIG. 1A illustrates a high level block diagram of a focal plane array and related circuitry in accordance with an embodiment of the invention.

FIG. 1A illustrates a high level block diagram of a focal plane array (FPA) 100 and related circuitry 102 in accordance with an embodiment of the invention. FPA 100 includes a unit cell array 110, column multiplexers 120 and 140, column amplifiers 130 and 150, a row multiplexer 160, control bias and timing circuitry 170, a digital to analog converter (DAC) 180, and a data output buffer 190.

As shown in FIG. 1A, FPA 100 and circuitry 102 may be implemented as part of a camera, such as an infrared camera 101. In this regard, it will be appreciated that, in addition to the various components of FPA 100 and circuitry 102, infrared camera 101 may also include one or more processors, memories, logic, displays, interfaces, lenses, and/or other components as may be appropriate in various implementations.

Unit cell array 110 includes a plurality of unit cells, each of which may include a detector and interface circuitry. The detector of each unit cell may be a photodetector (e.g., an avalanche photodiode or other appropriate detector) that provides a detector signal (e.g., charge, current, voltage, or other signal forms) in response to light (e.g., infrared light or other light) received by the detector during an integration period. The interface circuitry may provide an output signal such as an output voltage or current (e.g., corresponding to a data value associated with the light received by the detector) in response to the detector signal provided by the detector. Column multiplexer 140, column amplifiers 150, row multiplexer 160, and data output buffer 190 may be used to provide the output signals from unit cell array 110 as a data output signal 192. In this regard, column multiplexer 140, column amplifiers 150, row multiplexer 160, and data output buffer 190 may collectively provide a read out integrated circuit (ROIC) of FPA 100.

Each unit cell may further include one or more capacitors which may capture a reference signal such as a bias voltage (e.g., corresponding to a bias coefficient value) received at the unit cell to bias the detector of the unit cell to compensate for different response characteristics of the unit cell attributable to, for example, variations in temperature, manufacturing variances, and/or other factors. By providing appropriate bias voltages to each unit cell, unit cell array 110 may be effectively calibrated to provide accurate image data in response to infrared light incident on the detectors of the unit cells.

As shown in FIG. 1A, circuitry 102 may include a timing generation block 185 (e.g., which provides a plurality of clocks and/or other timing signals 186, 187, and 188 to FPA 100), DAC data register load circuitry 184, and a bias coefficient memory 189.

Bias coefficient memory 189 may store a plurality of bias coefficient values. For example, in one embodiment, one or more bias coefficient values may be stored for each unit cell of unit cell array 110. The bias coefficient values may be provided, in one embodiment, as a digital 12-bit data input signal 181 to DAC data register load circuitry 184 in response to timing signals 188. DAC data register load circuitry 184 may provide a data input signal 182 (e.g., corresponding to data input signal 181) in response to timing signals 187.

DAC 180 converts the digital bias coefficient values received in data input signal 182 into the bias voltages (e.g., analog signals 316) that may be provided to individual unit cells through the operation of column multiplexer 120, column amplifiers 130, and row multiplexer 160.

Figure 1B:
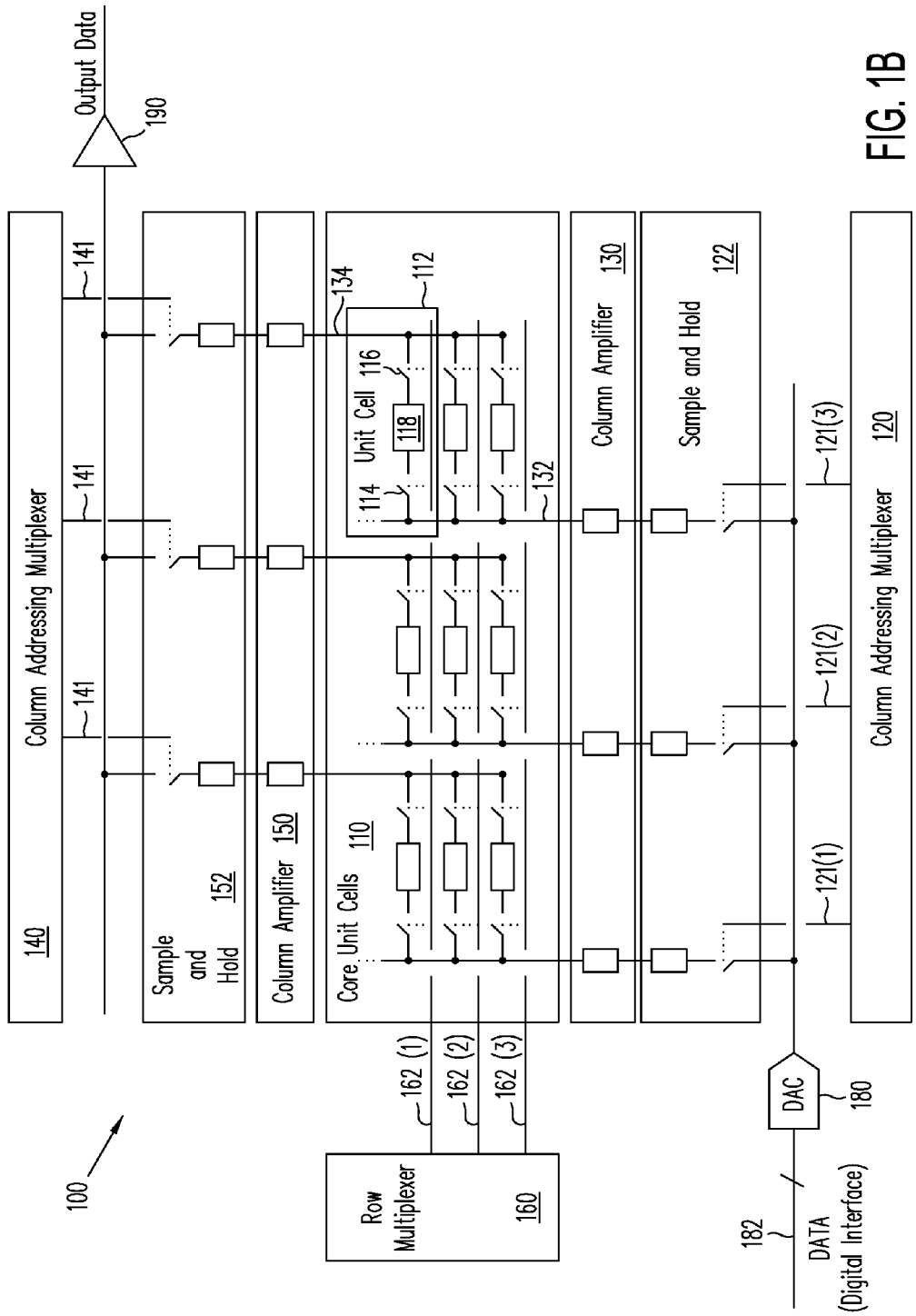
FIG. 1B illustrates a detailed block diagram of the focal plane array of FIG. 1A in accordance with an embodiment of the invention.

FIG. 1B illustrates a detailed block diagram of FPA 100 in accordance with an embodiment of the invention. In addition to various components shown in FIG. 1A, FIG. 1B further illustrates column enable lines 121 and 141, sample and hold circuitry 122 and 152, column input lines 132, column output lines 134, and row enable lines 162.

Column addressing multiplexer 120 may operate sample and hold circuitry 122 through column enable lines 121 to selectively provide bias voltages from DAC 180 to one or more columns of unit cells 112 through column amplifiers 130 and column input lines 132.

As also shown in FIG. 1B, each unit cell 112 of unit cell array 110 may include an input switch 114, an output switch 116, and a main circuit 118 (e.g., which may include a detector and one or more capacitors as further described herein). Input switches 114 may be selectively closed by row multiplexer 160 through row enable lines 162 to provide bias voltages from column input lines 132 to one or more capacitors of main circuits 118. Input switches 114 may also be selectively opened to isolate one or more capacitors of main circuits 118 from column input lines 132 after the bias voltages are stored by one or more capacitors of main circuits 118. As a result, one or more capacitors of main circuits 118 may be effectively decoupled from column input lines 132 (e.g., decoupled from bias voltage supply circuitry) and thus may remain relatively noise free while unit cell array 110 detects one or more image frames during one or more integration periods.

In some embodiments, the bias voltages are not required to be provided anew to each unit cell 112 for each image frame. Instead, the bias voltages may be retained by each unit cell 112 (e.g., stored on one or more capacitors of each unit cell 112) over many integration periods (e.g., ranging from several to hundreds or even thousands of integration periods in various embodiments). In another embodiment, the bias voltages may be provided to each unit cell 112 for each image frame (e.g., for each integration period).

As discussed, unit cells 112 may provide output signals in response to infrared light received by the detectors. Output switches 116 may be selectively closed by row multiplexer 160 through row enable lines 162 to provide the output signals such as output voltages or currents from detectors of main circuits 118 to column output lines 134. In one embodiment, input switches 114 and output switches 116 may be operated independently by different row enable lines 162. In another embodiment, input switches 114 and output switches 116 may be operated substantially simultaneously by shared row enable lines 162. Column addressing multiplexer 140 may operate sample and hold circuitry 152 through column enable lines 141 to selectively provide output signals from column output lines 134 to data output buffer 190.

Figure 1C:
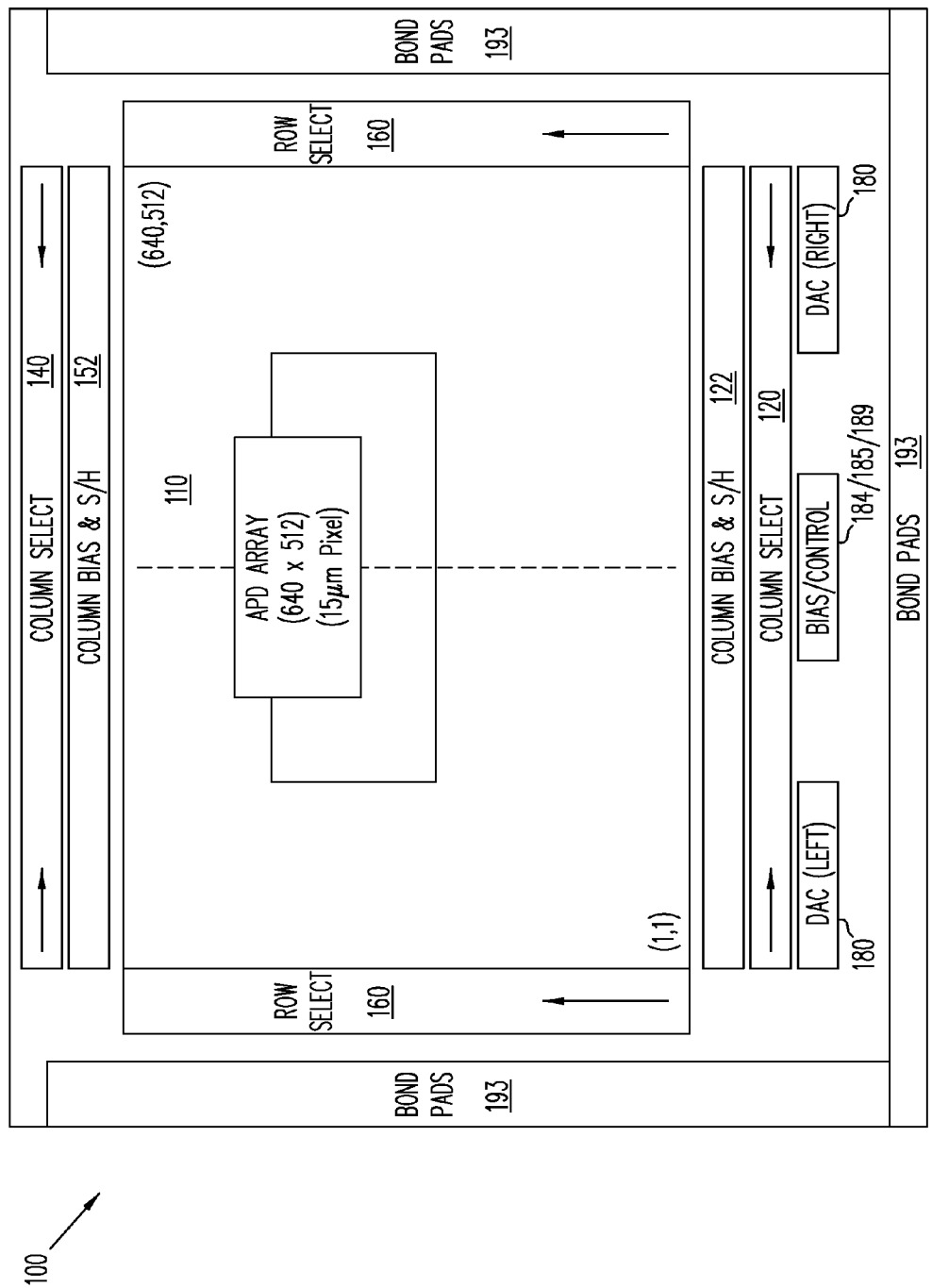
FIG. 1C illustrates a particular implementation example of the focal plane array of FIG. 1A in accordance with an embodiment of the invention.

FIG. 1C illustrates a particular implementation example of FPA 100 with unit cell array 100 implemented as a 640 by 512 array (e.g., corresponding to 640 by 512 pixels) in accordance with an embodiment of the invention. In addition to various components shown in FIGS. 1A and 1B, FIG. 1C further illustrates two DACs 180 and bond pads 193. In this regard, the two DACs 180, shown left and right respectively, may be used provide a higher overall digital data interface rate than a single DAC 180 as used in the embodiments shown in FIGS. 1A and 1B. Also, in the particular embodiment shown in FIG. 1C, DAC data register load circuitry 184, timing generation circuitry 185, and bias coefficient memory 189 are implemented as part of FPA 100.

Figure 2A:
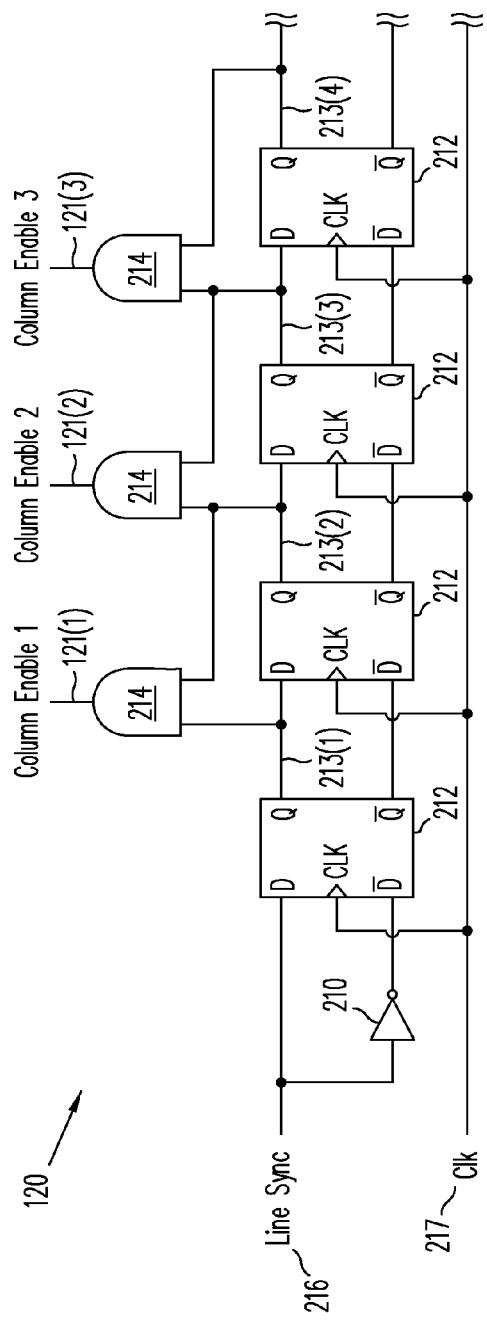
FIG. 2A illustrates a schematic diagram of a column multiplexer of the focal plane array of FIG. 1A in accordance with an embodiment of the invention.
Figure 2B:
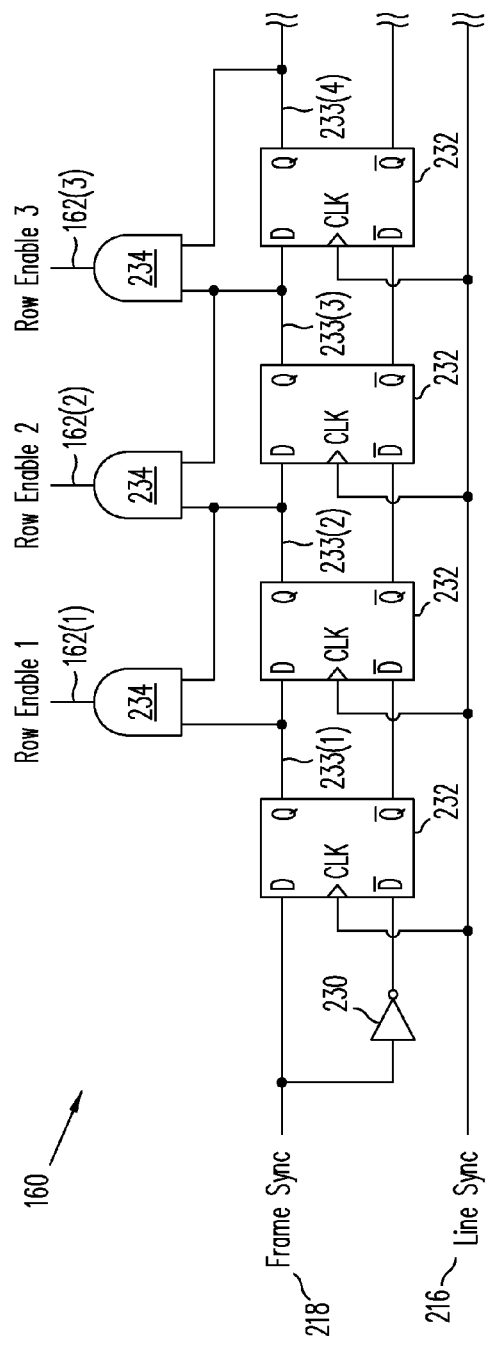
FIG. 2B illustrates a schematic diagram of a row multiplexer of the focal plane array of FIG. 1A in accordance with an embodiment of the invention.

FIGS. 2A and 2B illustrate schematic diagrams of column multiplexer 120 and row multiplexer 160, respectively, in accordance with several embodiments of the invention. Column multiplexer 120 and row multiplexer 160 each include a series of D flip-flops 212 and 232 configured as a column shift register and a row shift register, respectively. Input terminals of column and row AND gates 214 and 234 are connected to respective column and row D flip-flops 212 and 232. An output terminal of each column AND gate 214 is connected to a corresponding column enable line 121, and an output terminal of each row AND gate 234 is connected to a corresponding row enable line 161.

In FIG. 2A, the D terminal of the first one of D flip-flops 212 receives a line sync signal 216 which may be included in timing signals 186 or provided by control bias and timing circuitry 170 of FIG. 1A in several embodiments. The D inverted terminal of the first one of D flip-flops 212 receives line sync signal 216 through an inverter 210. In one embodiment, line sync signal 216 provides a pulse to indicate that data values corresponding to bias coefficients for a new row (e.g., line) are being provided by data input signal 182.

Clock input terminals of D flip-flops 212 receive a clock signal 217 which may be included in timing signals 186 or provided by control bias and timing circuitry 170 of FIG. 1A in several embodiments. It will be appreciated that line sync signal 216 may be provided through the column shift register provided by D flip-flops 212 as signals 213(1) to 213(4) which may be provided to AND gates 214 to provide column enable signals at column enable lines 121 to selectively operate switches of sample and hold circuitry 122 to sample data values provided by data input signal 182.

In FIG. 2B, the D terminal of the first one of D flip-flops 232 receives a frame sync signal 218 which may be included in timing signals 186 or provided by control bias and timing circuitry 170 of FIG. 1A in several embodiments. The D inverted terminal of the first one of D flip-flops 232 receives frame sync signal 218 through an inverter 230. In one embodiment, frame sync signal 218 provides a pulse to indicate that data values corresponding to bias coefficients for a new frame (e.g., a complete set of all rows and columns of FPA 110) are being provided by data input signal 182.

Clock input terminals of D flip-flops 232 receive line sync signal 216. It will be appreciated that line sync signal 216 may be provided through the row shift register provided by D flip-flops 232 as signals 233(1) to 233(4) which may be provided to AND gates 234 to provide row enable signals at row enable lines 162.

Column multiplexer 120 and row multiplexer 160 may be used to load bias voltages into unit cells 112 in response to the various signals identified in FIGS. 2A and 2B. For example, in one embodiment, bias voltages associated with a row of unit cells 112 may be sampled by sample and hold circuitry 122 in response to column enable signals provided over column enable lines 121, and then loaded into a desired row of unit cells in response to row enable signals provided over row enable lines 162. Subsequently, the next set of bias voltages associated with a next row of unit cells 112 may be sampled by sample and hold circuitry 122 and then loaded into the next row of unit cells 112. This process may continue until bias voltages have been provided to all unit cells 112 to complete an entire frame.

Figure 3A:
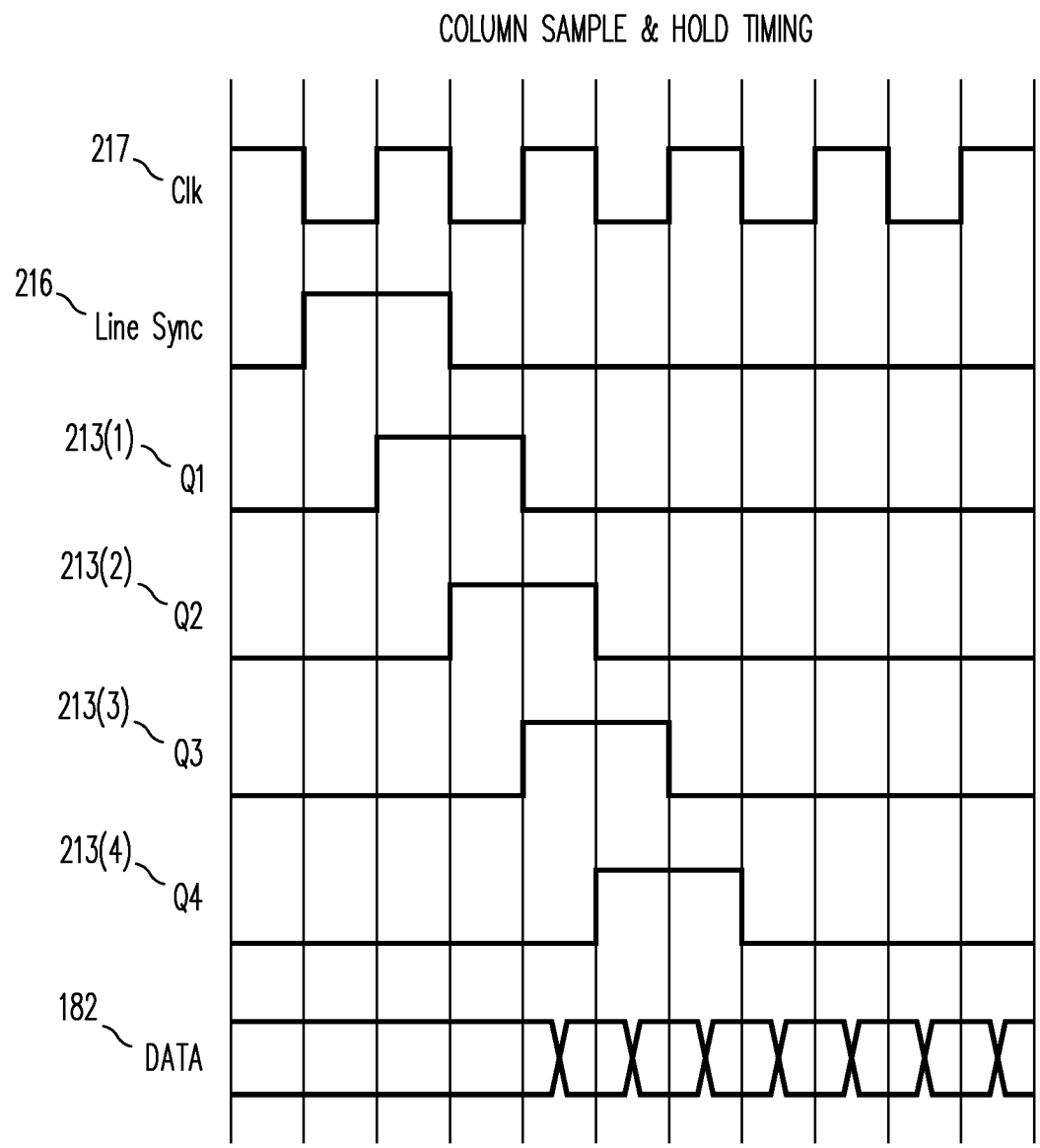
FIG. 3A illustrates a timing diagram detailing the operation of column timing of the focal plane array of FIG. 1A in accordance with an embodiment of the invention.

FIG. 3A illustrates a timing diagram detailing the operation of column timing of FPA 100 in accordance with an embodiment of the invention. In particular, FIG. 3A illustrates details of the timing for column multiplexer 120 and sample and hold circuitry 122.

Clock signal 217 provides repeated pulses that are applied substantially simultaneously to the CLK terminals D flip-flops 212 of column multiplexer 120. At the start of a row, line sync signal 216 provides a pulse to the D terminal of the first one of D flip-flops 212 and inverter 210 of column multiplexer 120. As shown in FIG. 3A, the pulse may be provided through the column shift register provided by D flip-flops 212 as signals 213(1) to 213(4) in response to pulses of clock signal 217. As discussed, signals 213(1) to 213(4) may be provided to AND gates 214 to provide column enable signals at column enable lines 121 to selectively operate switches of sample and hold circuitry 122 to sample data values provided by data input signal 182. In the embodiment shown in FIG. 3A, data values are provided by data input signal 182 for each rising and falling edge of clock signal 217.

In one embodiment, data values (e.g., analog voltages) received from DAC 180 may be sampled by different columns in response to signals provided to column enable lines 121. For example, particular data values may be sampled by the operation of particular column enable lines 121(1), 121(2), and/or 121(3) to close particular switches of sample and hold circuitry 122 while the remaining switches of sample and hold circuitry 122 remain open.

Figure 3B:
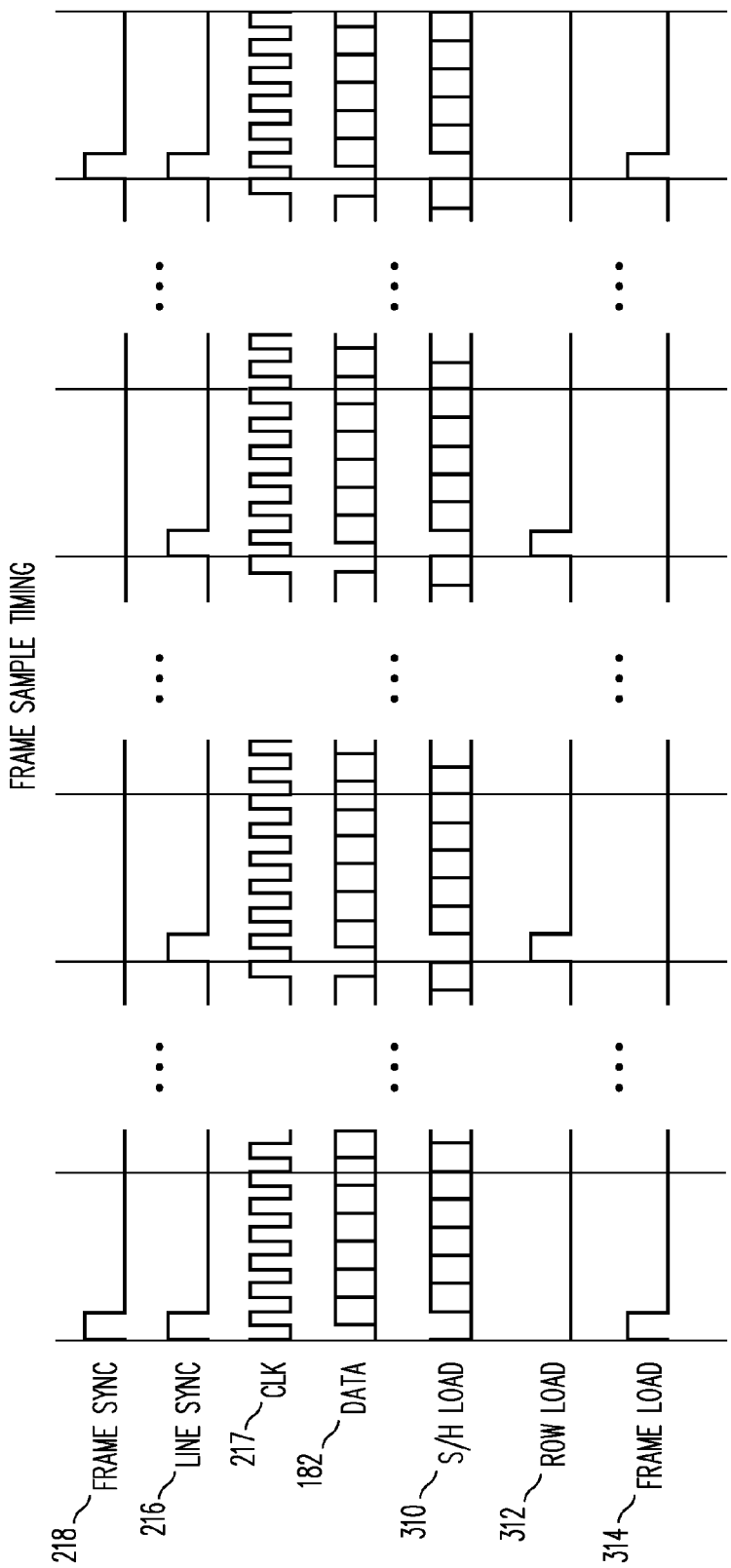
FIGS. 3B and 3C illustrate timing diagrams detailing the operation of frame timing of the focal plane array of FIG. 1A in accordance with several embodiments of the invention.

FIG. 3B illustrates a timing diagram detailing the operation of frame timing of FPA 100 in accordance with an embodiment of the invention. In particular, FIG. 3B illustrates data input signal 182, line sync signal 216, clock signal 217, and frame sync signal 218 previously described herein. In the embodiment shown in FIG. 3B, data values are provided by data input signal 182 for each rising edge of clock signal 217.

In addition, FIG. 3B illustrates a sample and hold (S/H) load signal 310, a row load signal 312, and a frame load signal 314. In one embodiment, S/H load signal 310 may be provided from control bias and timing circuitry 170 to column amplifiers 130 to load individual data values into column amplifiers 130. In one embodiment, row load signal 312 may be provided from control bias and timing circuitry 170 to column amplifiers 130 and unit cell array 110 to perform a row load operation triggered by line sync signal 216. In one embodiment, frame load signal 314 may be provided from control bias and timing circuitry 170 to column amplifiers 130 and unit cell array 110 to perform a frame load operation triggered by frame sync signal 218.

Figure 3C:
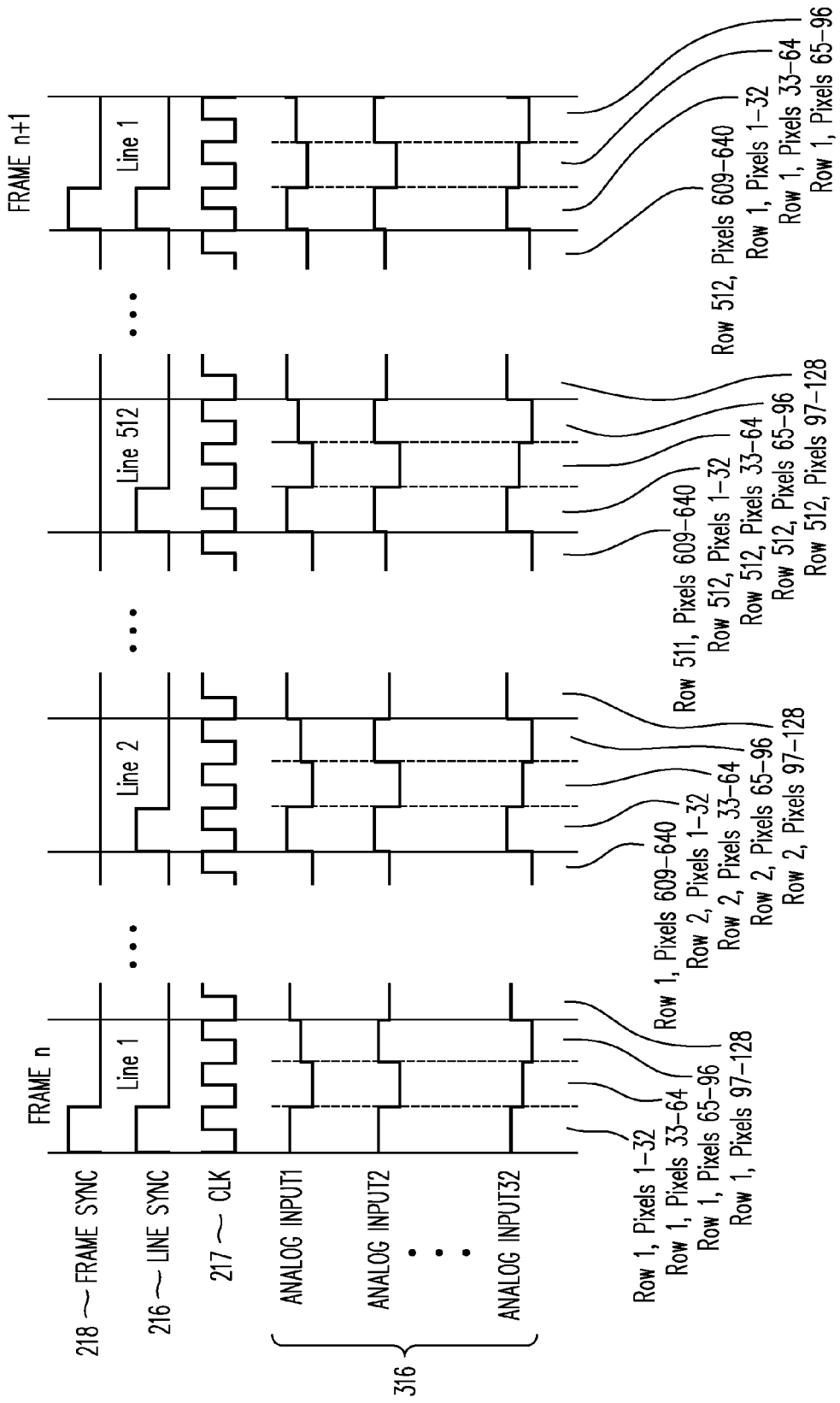

FIG. 3C illustrates another timing diagram detailing the operation of frame timing of FPA 100 in accordance with an embodiment of the invention. In particular, FIG. 3C illustrates line sync signal 216, clock signal 217, and frame sync signal 218 previously described herein. In addition, FIG. 3C illustrates analog input signals 316 corresponding to the analog values of the digital bias coefficient values. In one embodiment, 32 analog signals 316 may be provided as shown in FIG. 3C, and other numbers of analog signals 316 may be provided in other embodiments.

Figure 3D:
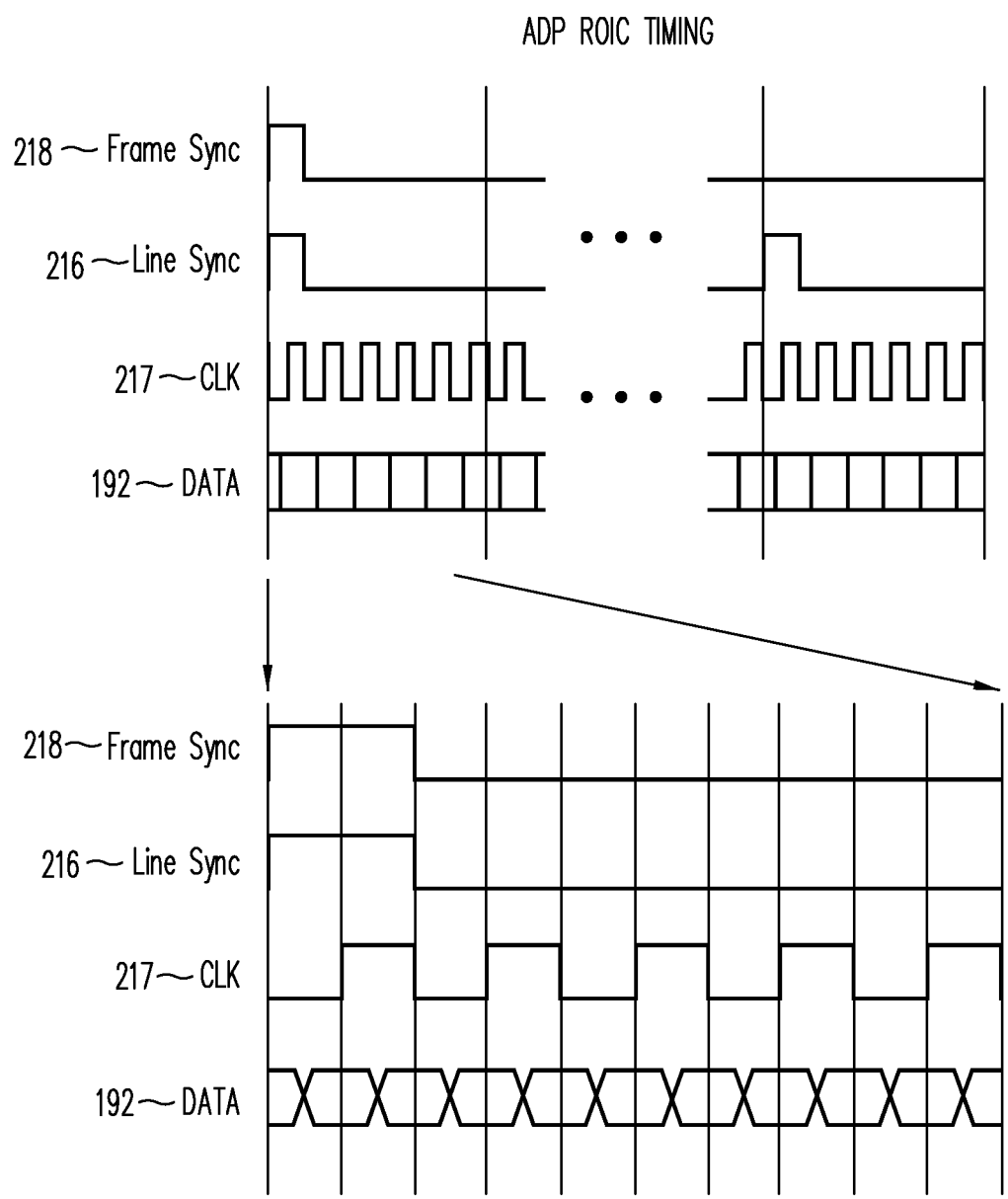
FIG. 3D illustrates a timing diagram detailing the operation of a read out integrated circuit (ROIC) of the focal plane array of FIG. 1A in accordance with an embodiment of the invention.

FIG. 3D illustrates a timing diagram detailing the operation of the ROIC of FPA 100 in accordance with an embodiment of the invention. In the upper portion of FIG. 3D, line sync signal 216, clock signal 217, frame sync signal 218, and data output signal 192 show the line, data load, frame, and data output timing for a first line of a frame and also for a representative subsequent line of the frame.

In the lower portion of FIG. 3D, these same timing signals are shown on an expanded time scale near the start of a new frame time. Frame sync signal 218 provides a pulse at the start of each new frame. Line sync signal 216 provides a pulse when data values are to be read out of a row of unit cells 112. Clock signal 217 provides repeated pulses. At each half cycle of clock signal 217, a data value is provided by data output signal 192.

In one embodiment, each unit cell 112 may be configured to selectively isolate its bias voltage from other portions of the unit cell 112 until an integration (e.g., a light detection operation) is performed by main circuits 118. For example, each unit cell 112 may initially store the bias voltage received from a connected column input line 132 on a capacitor that remains disconnected from the detector of main circuit 118 while other bias voltages are loaded into other unit cells 112. Prior to an integration period, the capacitors of all unit cells 112 may be connected substantially simultaneously to one or more other capacitors and/or the detectors of such unit cells 112 by closing appropriate switches of the unit cells.

In one embodiment, the process of loading bias voltages into unit cells 112 may be performed while main circuits 118 are performing an integration and/or while data values are read from unit cells 112. In this regard, one or more additional switches may be provided in main circuits 118 to permit bias voltages to be captured and held by a first capacitor during an integration and/or a data readout is performed. The bias voltage may then be provided to a second capacitor connected to the detector, or provided directly to the detector when the next integration and/or data readout is performed.

Figure 4:
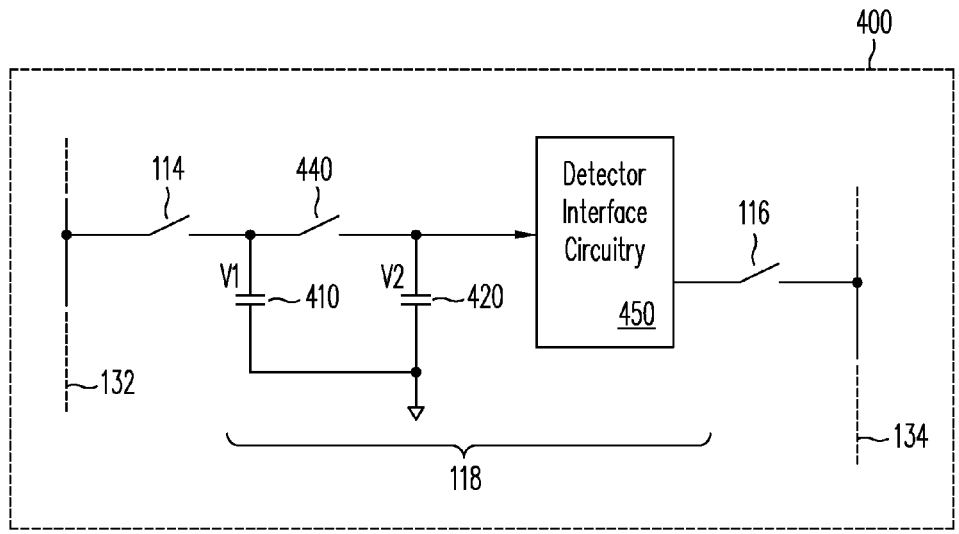
FIGS. 4-8 illustrate various implementations of unit cells of the focal plane array of FIG. 1A in accordance with several embodiments of the invention.

Unit cells 112 may be implemented in accordance with various embodiments. For example, FIG. 4 illustrates a unit cell 400 including switched capacitors 410 and 420, a switch 440, a detector/interface circuit 450, and switches 114 and 116 in accordance with an embodiment of the invention. In one embodiment, capacitors 410/420, switch 440, and detector/interface circuit 450 may be used to implement main circuit 118.

As shown in FIG. 4, capacitor 410 may be selectively connected to one of column input lines 132 through switch 114. Capacitors 410 and 420 may be selectively connected in parallel with each other through switch 440. Detector and interface circuit 450 may be selectively connected to one of column output lines 134 through switch 116.

In operation, switches 114, and 440 may initially be open. In one embodiment, switch 116 may also initially be open. In another embodiment, switch 116 may initially be closed (e.g., to permit the readout of a data value detected by detector and interface circuit 450).

Switch 114 may be closed (e.g., in response to one of row enable signals 162) to provide a bias voltage from one of column input lines 132 to capacitor 410. Switch 114 may then be opened which isolates capacitor 410 from the column input line 132. Capacitor 410 holds the bias voltage and may be selectively connected to capacitor 420 through switch 440.

When switch 440 is closed (e.g., in response to frame sync signal 218), capacitors 410 and 420 are connected in parallel with each other such that the charge held by capacitor 410 (e.g., associated with the bias voltage provided to capacitor 410) is distributed across both of capacitors 410 and 420. Thus, the final bias voltage held by the parallel configuration of capacitors 410 and 420 may differ from the bias voltage provided through column input line 132. In another embodiment, switch 440 may be opened such that the bias voltage is held by only capacitor 420 during an integration period. Capacitors 410 and 420 may be sized relative to each other in any desired fashion to scale the actual stored bias voltage as desired.

The bias voltage held by capacitors 410 and/or 420 may be used to bias a detector of detector/interface circuit 450 during an integration period of the detector. Detector/interface circuit 450 may be selectively connected to one of column output lines 134 through output switch 116 (e.g., in response to one of row enable signals 162) to provide an output voltage (e.g., data value) stored in response to a light-induced detector signal received from the detector of detector/interface circuit 450.

Figure 5:
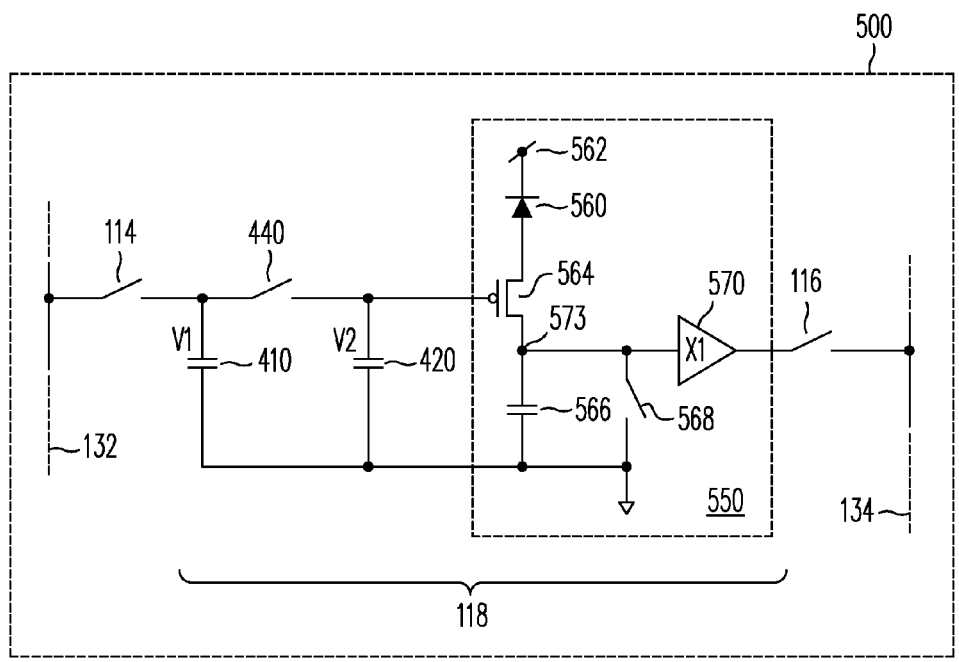

FIG. 5 illustrates another embodiment of a unit cell 500. As shown, unit cell 500 includes various components of other unit cells described herein. In addition, unit cell 500 includes an implementation of a detector/interface circuit 550 that includes a detector 560 (e.g., an avalanche photodiode in one embodiment), a transistor 564, a capacitor 566, a switch 568, and a buffer 570.

Detector 562 is connected to a reference voltage 562 and transistor 564. The bias voltage held by capacitors 410 and 420 (e.g., when switch 440 is closed) may be used to bias transistor 564 in order to adjust the detector signal that is provided to capacitor 566 (e.g., by direct injection) in response to infrared light incident on detector 560 during an integration period.

Following the integration period, switch 440 may be opened and switch 116 may be closed. An output voltage captured by capacitor 566 (e.g., stored at an output node 573) may be read out through buffer 570 (e.g., implemented as a unity gain amplifier in one embodiment) and switch 116. After the output voltage has been read out, switch 568 may be toggled to clear the output voltage held by capacitor 566.

Figure 6:
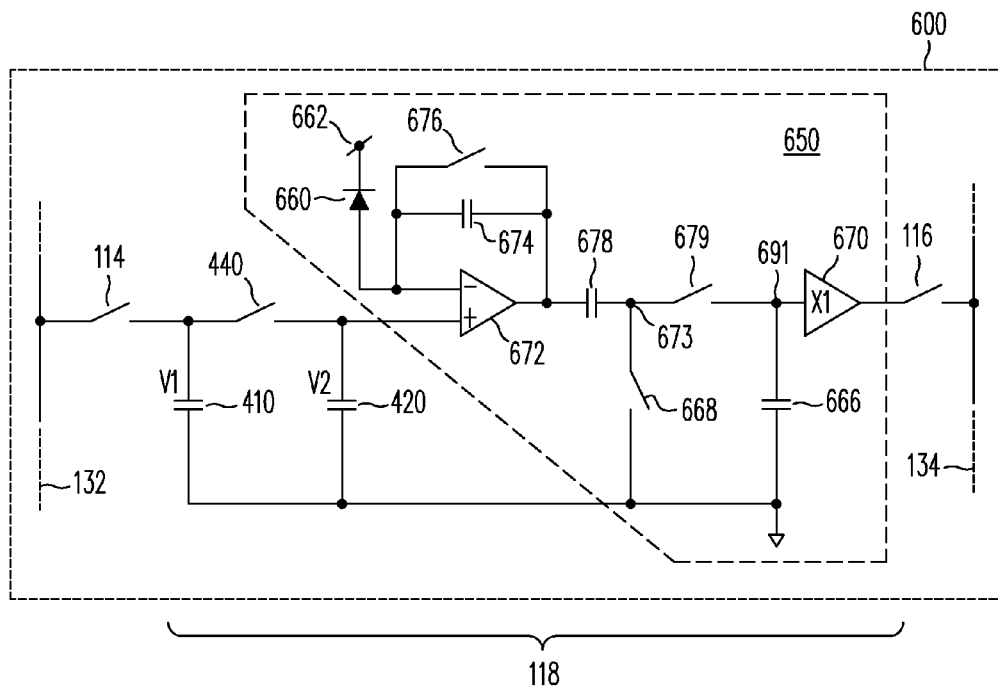

FIG. 6 illustrates another embodiment of a unit cell 600. As shown, unit cell 600 includes various components of other unit cells described herein. In addition, unit cell 600 includes an implementation of a detector/interface circuit 650 that includes a detector 660 (e.g., an avalanche photodiode in one embodiment), an amplifier 672, capacitors 666, 674, and 678, switches 668, 676, and 679, and a buffer 670.

Capacitor 674 is connected across an inverting input terminal and an output terminal of amplifier 672 to provide a feedback loop in accordance with a capacitive transimpedance amplifier (CTIA) configuration. Detector 660 is connected to a reference voltage 662 and an input of amplifier 672. The bias voltage held by capacitors 410 and 420 (e.g., when switch 440 is closed) may be provided to a non-inverting input terminal of amplifier 672 to adjust the output of amplifier 672 that is provided to capacitor 678 in response to infrared light incident on detector 660 during an integration period. During the integration period, switches 668, 676, and 679 may remain open. As a result, an output voltage may be built up on capacitor 678 (e.g., stored at an output node 673).

Following the integration period, switch 440 may be opened and switch 679 may be closed. The output voltage captured by capacitor 678 may be provided to capacitor 666 where it is held for readout (e.g., stored at another output node 691). Switch 679 may then be opened to isolate capacitor 666 from detector 660 and amplifier 672. Advantageously, this arrangement permits unit cell 600 to read out the output voltage through buffer 670 (e.g., implemented as a unity gain amplifier in one embodiment) and switch 116 while unit cell 600 prepares for and performs the next integration during a subsequent integration period.

In preparation for the next integration, switches 668 and 676 may be closed to reset (e.g., clear) capacitors 678 and 674, respectively. Switches 668 and 676 may then be opened and the next integration may be performed (e.g., using the bias voltage held by capacitors 410 and 420). In one embodiment, switch 676 may be opened before switch 668 is opened in order to reduce possible noise disturbances caused by the resetting of capacitor 674 (e.g., the closing of switch 676) from being integrated on capacitor 678. In this regard, it will be appreciated that this implementation allows unit cell 600 to perform correlated double sampling.

Figure 7:
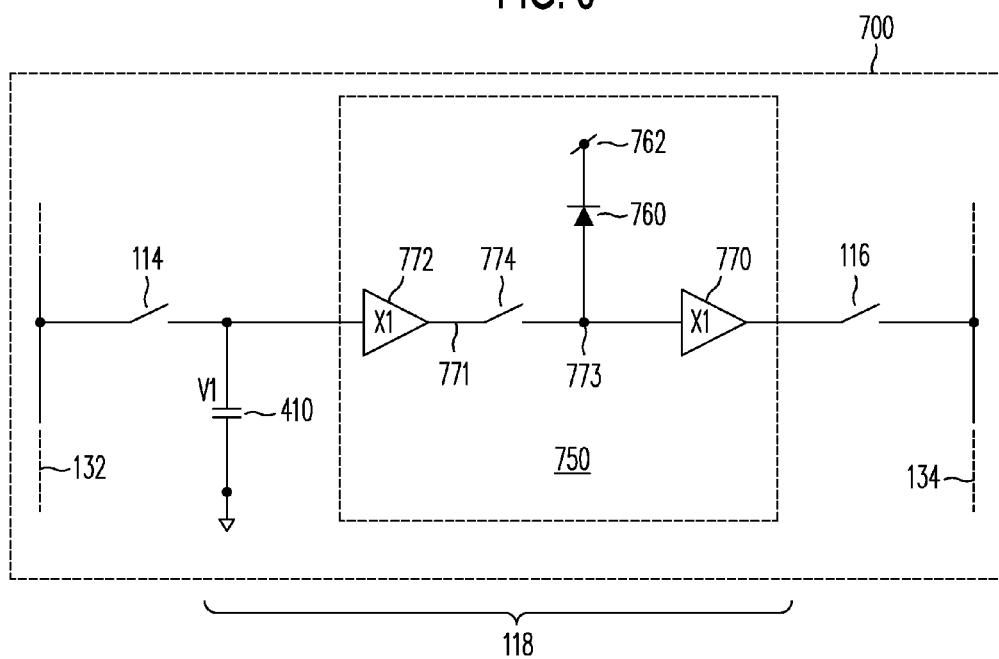

FIG. 7 illustrates another embodiment of a unit cell 700. As shown, unit cell 700 includes various components of other unit cells described herein. In addition, unit cell 700 includes an implementation of a detector/interface circuit 750 that includes a detector 760 (e.g., an avalanche photodiode in one embodiment), buffers 770 and 772, and a switch 774.

It will be appreciated that unit cell 700 includes only a single capacitor 410. In this regard, the bias voltage provided to capacitor 410 may be provided through buffer 772 (e.g., implemented as a unity gain amplifier in one embodiment) and held at an output terminal 771 of buffer 772 while switch 774 is open. Switch 774 may be closed (e.g., in response to frame sync signal 218) to provide the bias voltage to an output node 773. In one embodiment, output node 773 may exhibit a parasitic capacitance (e.g., provided by buffer 770) which acts as a capacitor to permit output node 773 to store the bias voltage. In one embodiment in which an array of unit cells 700 are provided, switches 774 of an array of unit cells 700 may be closed substantially simultaneously to provide bias voltages to output nodes 773 of array of unit cells 700 substantially simultaneously (e.g., at the start of an integration period).

Prior to the integration period, switch 774 may be opened. As a result, the bias voltage provided to output node 773 is retained by output node 773. As shown, detector 760 is connected to a reference voltage 762 and output node 773. During the integration period, the output voltage at output node 773 may change in response to the detector signal provided by detector 760. The previous bias voltage provided to output node 773 may operate to offset the output voltage at output node 773. Following the integration period, the output voltage at output node 773 may be read out through buffer 770 (e.g., implemented as a unity gain amplifier in one embodiment) and switch 116.

Figure 8:
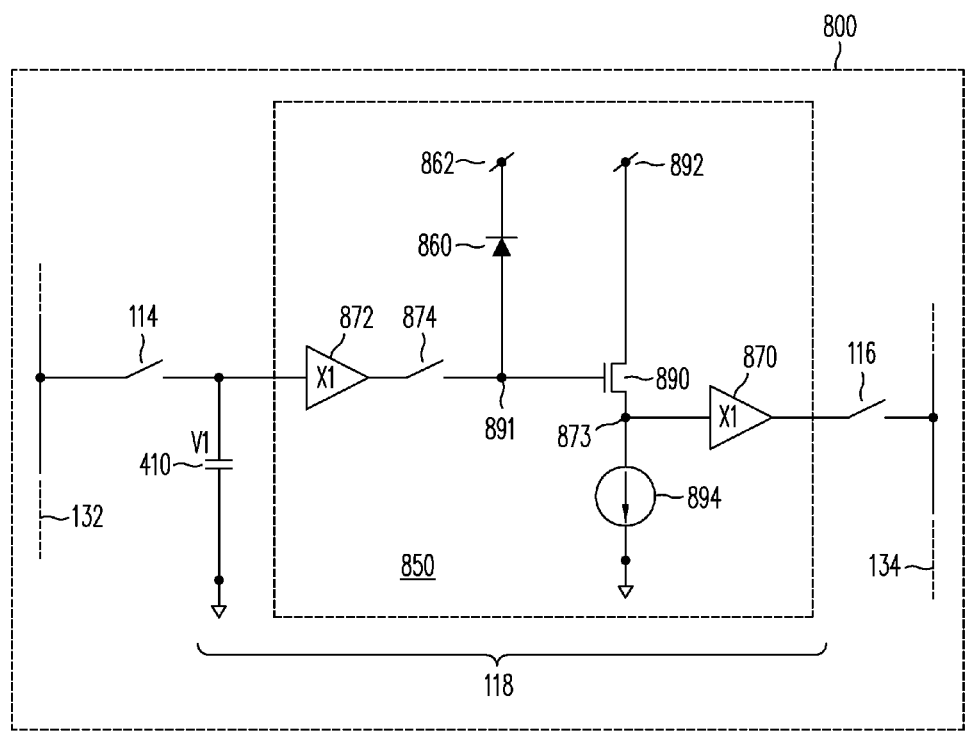

FIG. 8 illustrates another embodiment of a unit cell 800. As shown, unit cell 800 includes various components of other unit cells described herein. In addition, unit cell 800 includes an implementation of a detector/interface circuit 850 that includes a detector 860 (e.g., an avalanche photodiode in one embodiment), buffers 870 and 872, a switch 874, a transistor 890, a reference voltage 892, a current source 894, and a buffer 870.

In unit cell 800, switch 114, capacitor 410, buffer 872, switch 874, and detector 860 may be implemented and operated in the manner of similar components as described with regard to unit cell 700. In particular, detector 860 is connected to a reference voltage 862 and an intermediate node 891. During the integration period, the voltage at intermediate node 891 may change in response to the detector signal provided by detector 860. A previous bias voltage provided to intermediate node 891 may operate to offset the voltage at intermediate node 891 and thus calibrate the voltage provided to transistor 890. In one embodiment, intermediate node 891 may exhibit a parasitic capacitance (e.g., provided by transistor 890) which acts as a capacitor to permit intermediate node 891 to store the bias voltage.

As shown in FIG. 8, transistor 890 is connected to a reference voltage 892 and is also connected to current source 894 and buffer 870 at an output node 873 in a source follower configuration. Accordingly, the output voltage at output node 873 may change in response to the voltage provided to transistor 890 during an integration period. Following the integration period, the output voltage at output node 873 may be read out through buffer 870 (e.g., implemented as a unity gain amplifier in one embodiment) and switch 116.

Embodiments described above illustrate but do not limit the invention. It should also be understood that numerous modifications and variations are possible in accordance with the principles of the invention. Accordingly, the scope of the invention is defined only by the following claims.

We claim:

1. A unit cell of a focal plane array, the unit cell comprising:
a detector comprising an avalanche photodiode adapted to provide a detector signal in response to infrared light received by the detector;
a first capacitor adapted to store a bias voltage while additional bias voltages are loaded into other unit cells of the focal plane array;
a first switch adapted to connect the first capacitor to an input line to provide the bias voltage from the input line to the first capacitor and disconnect the first capacitor from the input line after the bias voltage is provided;
a second capacitor adapted to store the bias voltage during at least one integration period of the focal plane array;
a second switch adapted to provide the bias voltage from the first capacitor to the second capacitor prior to the at least one integration period; and
an output node adapted to store an output voltage that changes in response to the detector signal and the bias voltage stored by the second capacitor.

2. The unit cell of claim 1, wherein the second switch is adapted to operate substantially simultaneously with other second switches of the other unit cells which provide bias voltages from first capacitors of the other unit cells to second capacitors of the other unit cells.

3. The unit cell of claim 1, wherein the second capacitor is adapted to store the bias voltage during a plurality of integration periods of the focal plane array without requiring the bias voltage to be provided from the input line to the unit cell during the plurality of integration periods.

4. The unit cell of claim 1, wherein the second capacitor is a parasitic capacitance exhibited at the output node.

5. An infrared camera comprising the focal plane array of claim 1.

6. The unit cell of claim 1, further comprising:
a transistor connected to the detector and the second capacitor;
a third capacitor connected to the transistor and the output node to store the output voltage; and
a third switch connected to the third capacitor and adapted to reset the third capacitor.

7. The unit cell of claim 1, further comprising:
an amplifier comprising a first input terminal connected to the detector and a second input terminal connected to the second capacitor; and
a third capacitor connected between an output terminal of the amplifier and the output node to store the output voltage during the at least one integration period.

8. The unit cell of claim 7, further comprising:
a fourth capacitor adapted to receive the output voltage from the third capacitor and store the output voltage during a subsequent integration period;
a third switch adapted to provide the output voltage from the third capacitor to the fourth capacitor prior to the subsequent integration period; and
a fourth switch connected to the third capacitor and adapted to reset the third capacitor.

9. The unit cell of claim 8, further comprising:
a fifth capacitor connected between the first input terminal of the amplifier and the output terminal of the amplifier; and
a fifth switch connected to the fifth capacitor and adapted to reset the fifth capacitor.

10. The unit cell of claim 1, further comprising:
a buffer connected to the detector at the output node; and
wherein the second capacitor is a parasitic capacitance of the buffer.

11. The unit cell of claim 1, further comprising:
a first buffer connected between the first capacitor and the second switch;
a transistor connected to the detector;
a current source connected to the transistor at the output node;
a second buffer connected between the output node and the output switch; and wherein the second capacitor is a parasitic capacitance of the transistor.

12. A method of operating a focal plane array of an infrared camera, the method comprising:
- connecting a first capacitor of a unit cell of the focal plane array to an input line;
- providing a bias voltage from the input line to the first capacitor;
- disconnecting the first capacitor from the input line after the bias voltage is provided;
- storing the bias voltage at the first capacitor while additional bias voltages are loaded into other unit cells of the focal plane array;
- providing the bias voltage from the first capacitor to a second capacitor;
- storing the bias voltage at the second capacitor during at least one integration period of the focal plane array;
- biasing a detector with the bias voltage stored at the second capacitor during the at least one integration period, wherein the detector comprises an avalanche photodiode adapted to provide a detector signal in response to infrared light received by the detector; and
- storing at an output node an output voltage that changes in response to the detector signal and the bias voltage stored by the second capacitor.

13. The method of claim 12, wherein the providing the bias voltage is performed substantially simultaneously with a providing of the additional bias voltages from first capacitors of the other unit cells to second capacitors of the other unit cells.

14. The method of claim 12, further comprising storing the bias voltage at the second capacitor during a plurality of integration periods of the focal plane array without requiring the bias voltage to be provided from the input line to the unit cell during the plurality of integration periods.

15. The method of claim 12, wherein the second capacitor is a parasitic capacitance exhibited at the output node.

16. The method of claim 12, further comprising operating the other unit cells of the focal plane array in accordance with the method of claim 12.

17. The method of claim 12, further comprising:
- during the at least one integration period, providing the detector signal through a transistor to the output node;
- wherein the storing an output voltage comprises storing the output voltage at a third capacitor connected to the output node; and
- resetting the third capacitor.

18. The method of claim 12, further comprising:
- receiving the detector signal at a first input terminal of an amplifier;
- receiving the bias voltage from the second capacitor at a second input terminal of the amplifier; and
- wherein the storing an output voltage comprises storing the output voltage during the at least one integration period at a third capacitor connected between an output terminal of the amplifier and the output node.

19. The method of claim 18, further comprising:
- receiving the output voltage from the third capacitor at a fourth capacitor prior to a subsequent integration period;
- resetting the third capacitor prior to the subsequent integration period; and
- storing the output voltage at the fourth capacitor during the subsequent integration period.

20. The method of claim 19, further comprising:
- providing a feedback loop through a fifth capacitor connected between the first input terminal of the amplifier and the output terminal of the amplifier during the at least one integration period; and
- resetting the fifth capacitor prior to the subsequent integration period and prior to the resetting the third capacitor.

21. The method of claim 12, further comprising:
- receiving the detector signal at the output node;
- wherein the providing the bias voltage from the first capacitor to the second capacitor comprises providing the bias voltage to the output node; and
- wherein the second capacitor is a parasitic capacitance of a buffer connected to the detector at the output node.

22. The method of claim 12, further comprising:
- receiving the detector signal at a transistor connected to the detector;
- wherein the providing the bias voltage from the first capacitor to the second capacitor comprises providing the bias voltage to the transistor;
- wherein the second capacitor is a parasitic capacitance of the transistor; and
- wherein the output node connects the transistor to a current source and a second buffer.

* * * * *